United States Patent [19]
Nanno et al.

[11] Patent Number: 5,637,982
[45] Date of Patent: Jun. 10, 1997

[54] METHOD AND SYSTEM FOR DETECTING FULL CHARGE OF A RECHARGEABLE BATTERY IN A PORTABLE COMPUTER SYSTEM

[75] Inventors: Nobuyuki Nanno; Mayumi Maeda, both of Tokyo, Japan

[73] Assignee: Kabushiki Kaisha Toshiba, Kawasaki, Japan

[21] Appl. No.: 899,920

[22] Filed: Jun. 17, 1992

[30] Foreign Application Priority Data

Jun. 17, 1991 [JP] Japan .................. 3-171626

[51] Int. Cl.$^6$ .................. H02J 7/00
[52] U.S. Cl. .................. 320/31; 320/35
[58] Field of Search .................. 320/2, 5, 21, 30, 320/35, 36, 37, 38, 48, 15, 31

[56] References Cited

U.S. PATENT DOCUMENTS

| | | | |
|---|---|---|---|
| 3,917,990 | 11/1975 | Sherman, Jr. | 320/35 |
| 4,125,802 | 11/1978 | Godard | 320/35 |
| 4,398,140 | 8/1983 | Morishita | 320/36 |
| 4,424,476 | 1/1984 | Mullersman | 320/36 |
| 4,849,682 | 7/1989 | Bauer et al. | 320/15 |

*Primary Examiner*—Edward H. Tso
*Attorney, Agent, or Firm*—Oblon, Spivak, McClelland, Maier & Neustadt, P.C.

[57] ABSTRACT

When the display rate of a plasma display reaches a display rate exceeding the rated maximum electric power of the plasma display, the display mode of the plasma display is switched from a high brightness display mode to a normal brightness display mode. An item for selecting whether or not a battery recharge operation is enabled is provided to a setup menu screen. A user arbitrarily selects a charge mode (a battery charge operation is enabled in the normal brightness display mode) or a non-charge mode (the battery charge operation is disabled in the high brightness display mode). When the charge mode is selected, an electric power value obtained by subtracting electric power necessary for recharging the battery from the rated maximum electric power of the plasma display is set as a reference value, and when the display rate requires electric power exceeding the reference value, the display mode is switched from the high brightness display mode to the normal brightness display mode.

18 Claims, 8 Drawing Sheets

```
[[System Setup]]                                            Version * **

1. System
   Resume Mode            = ON              3. Memory
   Fast ROM               = OFF                Total           = 2048 KB
   CPU Sleep Mode         = Disable            System Memory   =  640 KB
   HDD Auto Off           = Disable            Hard RAM        = 1344 KB
   Display Auto Off       = Disable            EMS             =   64 KB
   System Speaker         = Enable             Extended        =    0 KB
   Battery Alarm          = Enable          4. Printer
   External FDD/PRT       = Printer            Parallel PRT    = Output
   Keyboard               = 101Key          5. Communication
                                               IRQ5 SIO Base Address = 3E8h
2. Display                                     Serial Port Set Mode  = A
   Display Mode           = Normal             Serial A Port No.     = 1
   Primary Display Type   = CGA[80*25]         Serial B Port No.     = 3
   Recharge Battery       = Enable             Built-in Modem Port No. = 2
                            ↓                  Built-in Modem Power  = OFF
        101               Disable ─────────────────── Instruction ───────────────────
↑ & ↓ KEYS - Select Options   ← & → KEYS-Select Values  F5 - Set Defaults
Enter - Exit and Save Changes    Esc - Exit and Disregard Changes
```

FIG. 9

METHOD AND SYSTEM FOR DETECTING FULL CHARGE OF A RECHARGEABLE BATTERY IN A PORTABLE COMPUTER SYSTEM

BACKGROUND OF THE INVENTION

1. Field of the Invention

The present invention relates to a power source control apparatus and method for a computer system having a rechargeable battery in addition to an AC power source as a system power source.

2. Description of the Related Art

In conventional compact (e.g., lap-top type) computers, a method of driving the computer by a rechargeable battery power source mounted in the computer is known. In a computer adopting this method, when an AC power source is used as a system power source, electric power excluding an electric power amount to be supplied to the system is used for charging a battery.

The computer mounts a display (e.g., a plasma display) for displaying data. Some computers, which can perform a display in a high brightness display mode (shown by reference numeral 1 in FIG. 1), are available. The high brightness display mode requires a large electric power amount although the display performance can be improved as compared to a normal brightness display mode (shown by reference numeral 3 in FIG. 1).

For this reason, when a display operation in the high brightness display mode is executed, the electric power amount that can be used for charging the battery is often considerably decreased. In practice, when data is displayed on the display in the high brightness display mode, if the display rate (a percentage of number of pixels which are turned on with respect to total number of pixels constituting a display screen) of data on the display screen is increased, extra electric power is consumed for the display operation, and electric power for charging the battery can no longer be obtained. Thus, it becomes impossible to charge the battery.

In another method, an electric power amount excluding an electric power amount used for the display operation of the total electric power amount used by the system power source is automatically used for charging the battery. However, when the display operates in the high brightness display mode, the electric power amount that can be used for charging the battery is considerably decreased, and it becomes practically impossible to charge the battery.

In this case, although an effective charge operation cannot be made in practice, the system automatically executes the charge operation of the battery, and informs a message indicating the execution of the charge operation to a user. For this reason, the charging time of the battery is apparently prolonged, and an LED lamp indicating a low battery does not turn from red (low battery) to green (full charge). Therefore, a user may erroneously recognize that the system is malfunctioning.

Furthermore, a long charging time is required in order to obtain the full charge, and hence, the battery is overheated. As a result, the system may be damaged. Note that a method for detecting the full charge is described in U. S. Ser. No. 07/578,613, for example.

SUMMARY OF THE INVENTION

It is an object of the present invention to provide a power source control apparatus and method for a computer system, wherein when electric power to be supplied to a plasma display exceeds a reference value, the display brightness mode of the plasma display is switched from a high brightness mode to a normal brightness mode, so that the electric power to be supplied to the plasma display can be controlled to be constant even when the display rate of the plasma display is increased.

It is another object of the present invention to provide a power source control apparatus and method for a computer system having a rechargeable battery and a plasma display, wherein excessive electric power obtained by switching the display brightness mode of the plasma display from the high brightness mode to the normal brightness mode can be used for charging the battery.

It is still another object of the present invention to provide a power source control apparatus and method for a computer system, wherein a means allowing selection between a charge mode (a battery charge operation is enabled in a normal brightness display mode) and a non-charge mode (the battery charge operation is disabled in a high brightness display mode) is provided on a setup menu screen, and when the charge mode is selected, the display mode is switched between the high brightness display mode and the normal brightness display mode using, as a reference value, a value obtained by subtracting electric power necessary for the battery charge operation from electric power necessary for the high brightness display mode.

It is still another object of the present invention to provide a power source control apparatus and method for a computer system having a rechargeable battery, wherein a first temperature sensor for detecting a temperature in a battery pack, and a second temperature sensor for detecting an external temperature are arranged, and whether or not the battery is fully charged is detected based on a temperature difference between the temperature in the battery pack and the external temperature, the temperatures in the battery pack before and after an elapse of a predetermined period of time from a given time, and the external temperatures before and after an elapse of a predetermined period of time from a given time.

According to the first aspect of the present invention, a power source control apparatus for a portable computer, provided with an AC adapter for supplying a power source, a rechargeable battery, a charge circuit for charging the battery, and a power source controller for controlling the charge circuit, comprises: selecting means for selecting whether the battery must be charged or not in accordance with a power from the AC adapter; storage means connected to the selecting means for storing contents selected by the selecting means; means connected to the selecting means, for reading the contents stored in the storage means and for preparing a command indicating the read out contents; means for transmitting the command to the power source circuit; and control means for controlling the charge circuit in accordance with the contents of the transmitted command.

According to a second aspect of the present invention, a power source control apparatus for a portable computer, provided with an AC adapter for supplying a power, and a rechargeable battery, comprises: specifying means for specifying whether the battery is to be charged or not in accordance with a power from the AC adapter; a flat panel display unit for generating a discharge voltage from a power supplied from the AC adapter and the battery, for applying the discharge voltage to a cell provided for each pixel, and for brightness-displaying characters and graphics; detecting means for determining contents specified by the specifying means, and for detecting a voltage value and a current value to be supplied to the flat panel display unit, when the contents specify the battery to be charged; storage means for storing a reference value; comparing means connected to the detecting means and the storage means for comparing the detected value with the reference value; means for generating a brightness control data for decreasing the discharge voltage when a comparison result of the comparing means indicates that the detected value is larger than the reference value; and means for controlling the discharge voltage to be applied to the cells in order to control the brightness of the pixels in accordance with the brightness control data.

According to a third aspect of the present invention, a power source control apparatus for a portable computer, provided with an AC adapter for supplying a power, and a rechargeable battery pack connected to the AC adapter, comprises: a first temperature sensor provided within the battery pack; a first temperature detecting means for detecting the temperature state within the battery by the first temperature sensor; a second temperature sensor; a second temperature detecting means for detecting an ambient temperature state out of the battery pack by the second temperature sensor; and first determining means for comparing the first temperature value obtained from the first temperature detecting means and the second temperature value obtained from the second temperature detecting means and for determining that the battery pack is fully charged when the first temperature value is larger than the second temperature value by the reference value.

According to a fourth aspect of the present invention, a power source control method for a portable computer, provided with an AC adapter for supplying a power source, a rechargeable battery, a charge circuit for charging the battery, and a power source controller for controlling the charge circuit, comprises the steps of: a) selecting whether the battery must be charged or not in accordance with a power from the AC adapter; b) storing contents selected in step a); c) reading the contents stored in step b) and for preparing a command indicating the read out contents; d) transmitting the command to the power source circuit; and e) controlling the charge circuit in accordance with the contents of the transmitted command.

According to a fifth aspect of the present invention, a power source control method for a portable computer, provided with an AC adapter for supplying a power, and a rechargeable battery, comprises the steps of: a) specifying whether the battery is to be charged or not in accordance with a power from the AC adapter; b) generating a discharge voltage from a power supplied from the AC adapter and the battery, for applying the discharge voltage to a cell provided for each pixel, and for brightness-displaying characters and graphics; c) determining contents specified in step a), and for detecting a voltage value and a current value to be supplied to the flat panel display unit, when the contents specify the battery to be charged; d) storing a reference value; e) comparing the detected value with the reference value; f) generating a brightness control data for decreasing the discharge voltage when a comparison result in step e) indicates that the detected value is larger than the reference value; and g) controlling the discharge voltage to be applied to the cells in order to control the brightness of the pixels in accordance with the brightness control data.

According to a sixth aspect of the present invention, a power source control method for a portable computer, provided with an AC adapter for supplying a power, and a rechargeable battery pack connected to the AC adapter, comprising the steps of: a) detecting a temperature state within the battery by a first temperature sensor provided within the battery pack; b) detecting an ambient temperature state out of the battery pack by a second temperature sensor provided out of the battery pack; and c) comparing the first temperature value obtained in step a) and the second temperature value obtained in step b) and for determining that the battery pack is fully charged when the first temperature value is larger than the second temperature value by the reference value.

According to the present invention, when the display rate of a plasma display reaches a display rate exceeding rated maximum electric power of the plasma display, the display mode of the plasma display is switched from a high brightness display mode to a normal brightness display mode.

An item for selecting whether or not a battery recharge operation is enabled is provided to a setup menu screen. Thus, a user can arbitrarily select a charge mode (a battery charge operation is enabled in a normal brightness display mode) or a non-charge mode (the battery charge operation is disabled in a high brightness display mode). When the charge mode is selected, an electric power value obtained by subtracting electric power necessary for recharging the battery from the rated maximum electric power of the plasma display is set as a reference value, and when the display rate reaches a value requiring electric power exceeding the reference value, the display mode is switched from the high brightness display mode to the normal brightness display mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a view showing a setup menu screen displayed on a PDP 37 in the setup processing.

DETAILED DESCRIPTION OF THE PREFERRED EMBODIMENTS

Figure 2:
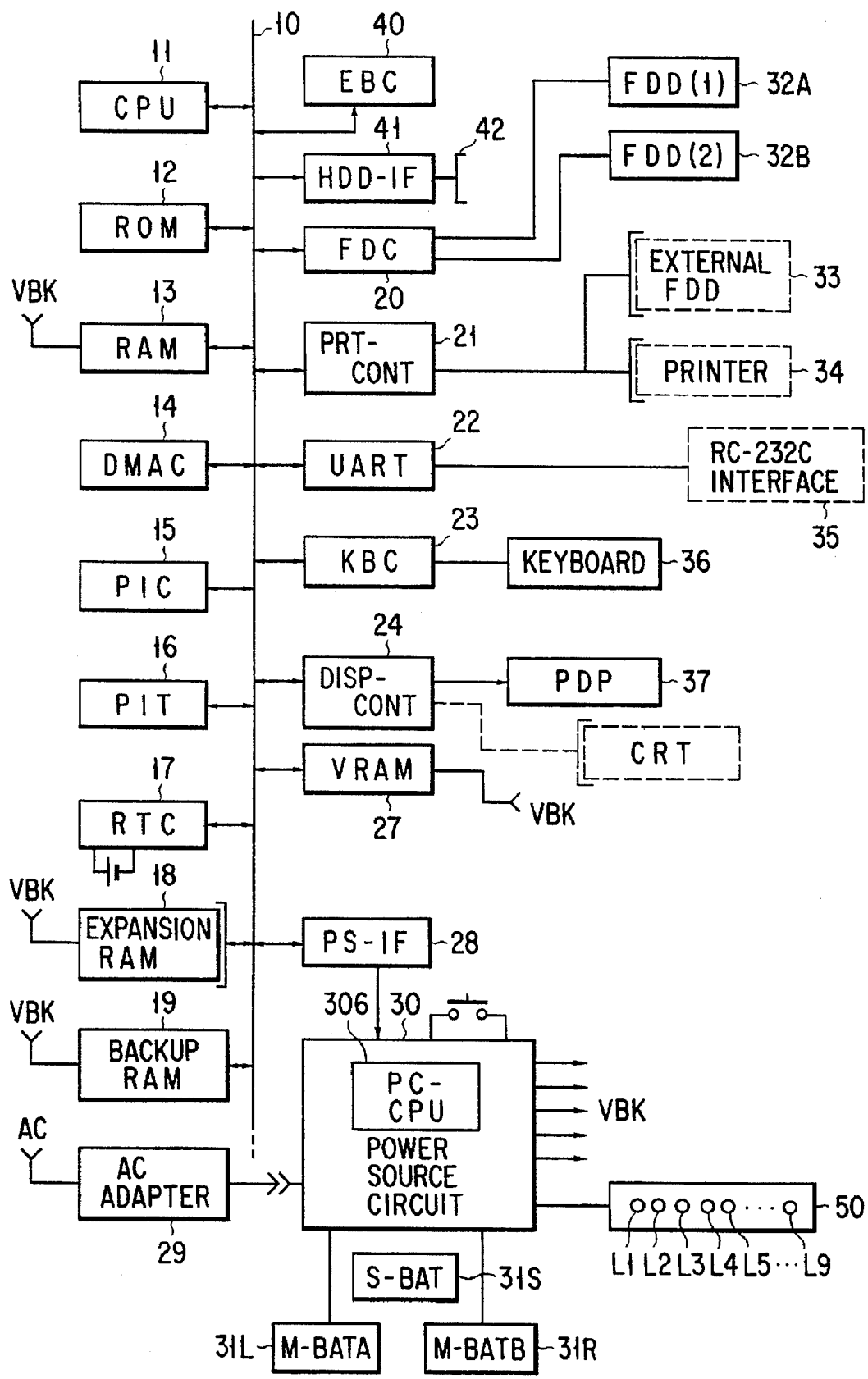
FIG. 2 is a system block diagram showing the overall computer system adopting a power source control apparatus according to the present invention.

FIG. 2 is a block diagram showing the overall computer system adopting a power source control apparatus according to the present invention.

In FIG. 2, reference numeral 10 denotes a system bus; and 11 through 28, components connected to the system bus 10. Of these components, reference numeral 11 denotes a CPU (main CPU) for controlling the entire system. The main CPU 11 accesses a BIOS-ROM 12 upon power-ON, and executes an IRT routine and a setup routine shown in FIGS. 7 and 8.

Reference numeral 12 denotes the BIOS-ROM for storing a permanent program. The BIOS-ROM 12 stores the IRT routine and the setup routine shown in FIGS. 7 and 8. Reference numeral 13 denotes a RAM constituting a main memory for storing a program, data, and the like, which are to be processed; and 14, a DMA controller (DMAC: Direct Memory Access Controller) for performing direct memory access control. Reference numeral 15 denotes a programmable interrupt controller (PIC); and 16, a programmable interval timer (PIT).

Reference numeral 17 denotes a timepiece module (RTC; Real-time Clock) having an independent operating battery. The RTC 17 stores selection data, selected in a setup menu (to be described later), for selecting whether or not a charge mode is enabled, in addition to date and time data. Reference numeral 18 denotes a large-capacity expansion RAM, which can be inserted/removed to/from a special-purpose card slot of a main body. In this case, a total of four arbitrary memory cards (existing 1- and 2-MB memory cards and new 4- and 8-MB memory cards) can be mounted.

Reference numeral 19 denotes a backup RAM serving as a data holding area for realizing a resume function. The backup RAM 19 is supplied with a backup power source voltage (VBK). The backup RAM 19 stores, e.g., the contents of memories and registers when the power source is turned off in a resume mode.

Reference numeral 20 denotes a floppy disk controller (FDC). In this embodiment, the controller 20 controls two floppy disk drives 32A and 32B. In place of one floppy disk drive (e.g., the FDD 32B), a 2.5" hard disk drive can be mounted to easily improve the system configuration.

Reference numeral 21 denotes a printer controller (PRT-CONT), which is selectively connected to a 5" external floppy disk drive 33 or a printer 34 through a connector.

Reference numeral 22 denotes an input/output interface (UART; Universal Asynchronous Receiver/Transmitter), which is connected to an RS-232C interface 35, or the like, as needed.

Reference numeral 23 denotes a keyboard controller (KBC) for controlling inputs at a keyboard 36 arranged integrally with an apparatus main body mounting a CPU board.

Reference numeral 24 denotes a display controller (DISP-CONT). In this embodiment, the controller 24 controls a display operation of only a plasma display unit (PDP) 37. The controller 24 may control the display drive operation of a CRT display unit as an external display. Reference numeral 27 denotes a video RAM (VRAM) supplied with the backup power source voltage (VBK).

Reference numeral 28 denotes a power source control interface (PS-IF) for connecting a power source circuit (intelligent power supply) 30 to the CPU 11 through the system bus 10. In this case, the interface 28 has a parallel/serial conversion function for performing data transfer using a serial interface between the CPU 11 and a power control CPU (PC-CPU) 306 of the power source circuit 30. Reference numeral 29 denotes a power source adapter (to be referred to as an AC adapter hereinafter) for rectifying and smoothing a commercial AC power source voltage (AC) to obtain a DC operating power source voltage having a predetermined potential. The AC adapter 29 is plug-in-connected to the portable computer main body.

Reference numeral 30 denotes the power source circuit (intelligent power supply) comprising the power control CPU (PC-CPU); 33, a power switch for turning on/off the power source of the portable computer main body; and 31L and 31R, main battery packs (M-BATA, M-BATB) comprising rechargeable batteries and detachable from the apparatus main body (PC main body). In a drive mode, one of the two batteries is selected as an object to be used (an object to be supplied with a power source) under the control of the power source circuit 30. When the selected battery is discharged to a use limit, the battery to be used is switched, and the other battery serves as an object to be used in turn. Reference numeral 31S denotes a built-in type sub battery (S-BAT) comprising a rechargeable battery and incorporated in the main body. The battery 31S supplies the backup power source voltage (VBK) to the RAM 13, the expansion RAM 18, the VRAM 27, and the like, which are required to be backed up.

Reference numeral 40 denotes an expansion bus connector (EBC) used for extending functions. For example, the connector 40 is selectively connected to an external hard disk drive (external HDD), as needed, or is selectively mounted on an expansion unit comprising various components for extending functions (e.g., a keyboard, a CRT display, a large-capacity memory, a personal computer mounting mechanism, and the like), and is coupled to the corresponding circuit.

Reference numeral 41 denotes an internal HDD interface (HDD-IF) for interface-connecting an internal HDD (with an HDC) when the system is improved to an HDD mounting type system (mounting one HDD and one FDD). When the system configuration is improved, the interface 41 is interface-connected to the internal HDD through a connector 42 in place of the FDD 32B.

Reference numeral 50 denotes a state display unit comprising a plurality of state display LEDs (L1 through L9), whose display drive operations are controlled under the control of the power control CPU 306 of the power source circuit 30.

Figure 3:
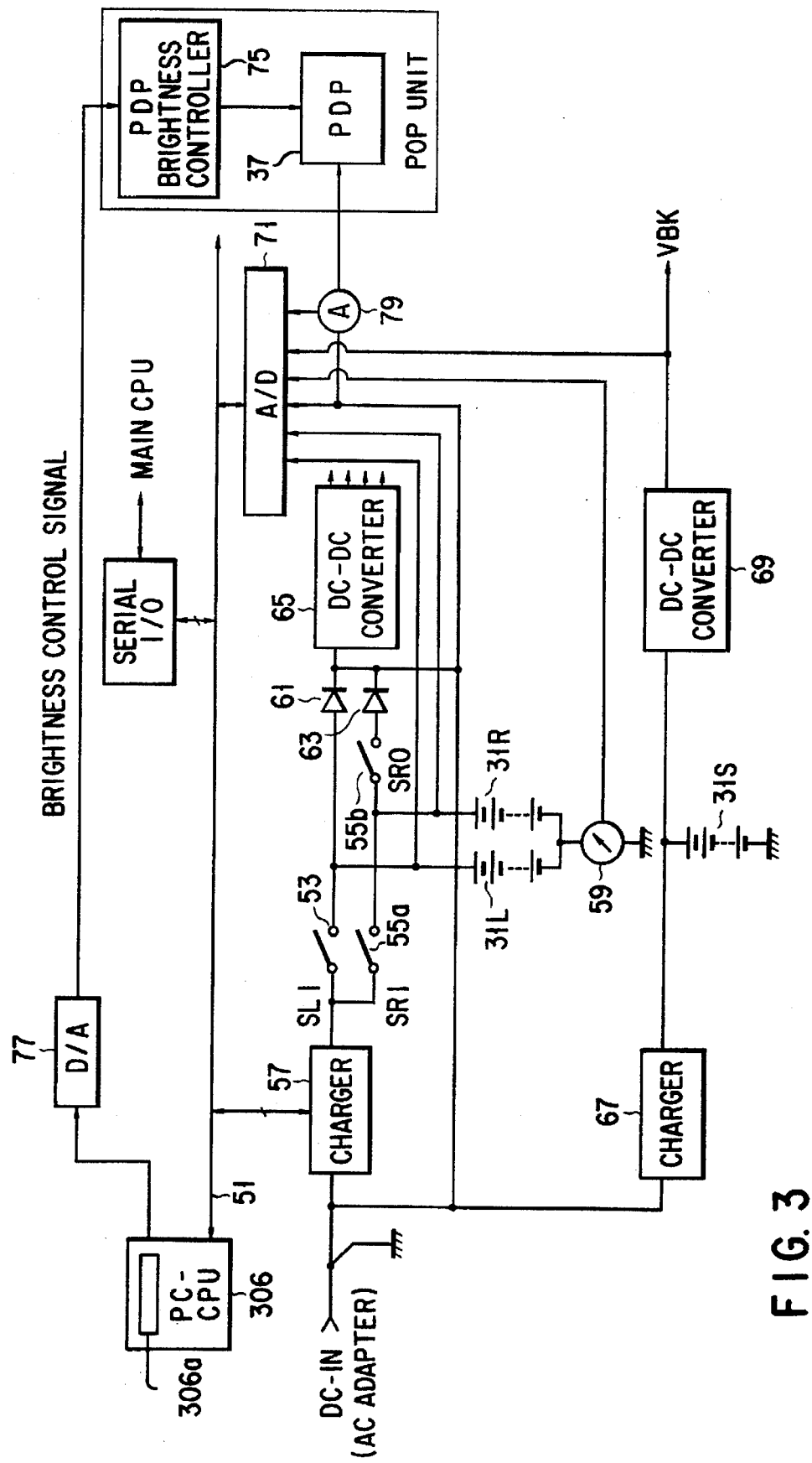
FIG. 3 is a block diagram showing details of the power source control apparatus shown in FIG. 2.

FIG. 3 is a block diagram showing the arrangement of the power source circuit 30.

Reference numeral 306 denotes the power control CPU (PC-CPU) for performing centralized management of the power source of the entire apparatus. The PC-CPU 306 receives data from the respective sections of the power source circuit 30 through an internal bus 51, and instruction data from the main CPU 11, and controls the power supply states of the respective units in the apparatus according to the instruction from the main CPU 11, the internal state, the external operation state, and the like. In this embodiment, the PC-CPU 306 has a power source control processing function including charge control for the right and left batteries (M-BATB, M-BATA) according to charge setup data (charge control parameters), and battery drive control. The PC-CPU 306 has a register 306a for storing a brightness setting value.

Reference numeral 53 denotes a main battery switch (SL1), which is inserted in a current supply path of the left main battery (M-BATA) 31L, and is ON/OFF-controlled by an output from an IO driver under the control of the PC-CPU 306. Reference numerals 55a and 55b denote main battery switches (SRI, SRO) which are respectively inserted in a current supply path and a current output path of the main battery (M-BATB) 31R, and are ON/OFF-controlled by an output from the IO driver. Reference numeral 57 denotes a charger for charging the main batteries (M-BATA and M-BATB) 31L and 31R under the control of the PC-CPU 306. Reference numeral 59 denotes a current detector for detecting output currents of the main batteries (M-BATA and M-BATB) 31L and 31R. Reference numerals 61 and 63 denote diodes, inserted in the current output paths of the main batteries (M-BATA and M-BATB) 31L and 31R, for preventing a reverse current flow. Reference numeral 65 denotes a DC-DC converter for obtaining operation power source voltages for the respective units in the apparatus from a power source voltage from the left main battery (M-BATA) 31L via the main battery switch 53, or from a power source voltage from the right main battery (M-BATB) 31R via the main battery switches 55a and 55b. Reference numeral 67 denotes a charger for charging the sub battery (S-BAT) 31S; and 69, a DC-DC converter for obtaining a backup power source voltage (VBK) from a power source voltage from the sub battery (S-BAT) 31S. Reference numeral 71 denotes an A/D converter for performing analog/digital conversion for supplying the output voltages from the main batteries (M-BATA and M-BATB) 31L and 31R, the output voltages from the DC-DC converters 65 and 69, and the like to the PC-CPU 306 as digital data. Reference numeral 73 denotes a serial I/O for exchanging data between the PC-CPU 306 and the main CPU 11. The serial I/O 73 converts data received from the PC-CPU 306 into serial data, and outputs the serial data to the PS-IF 28. The PS-IF 28 converts the serial data into parallel data, and supplies the parallel data to the main CPU 11.

The PDP 37 executes a display operation according to the power source voltage from the DC-DC converter 65. A PDP brightness controller 75 executes brightness control of the PDP 37 according to a brightness control signal from a D/A converter 77. The D/A converter 77 converts the brightness setting value stored in the register 306a of the PC-CPU 306 into an analog brightness control signal.

An ammeter 79 detects a current supplied to the PDP 37, and outputs the detected current to the PC-CPU 306 through the A/D converter 71.

Figure 4:
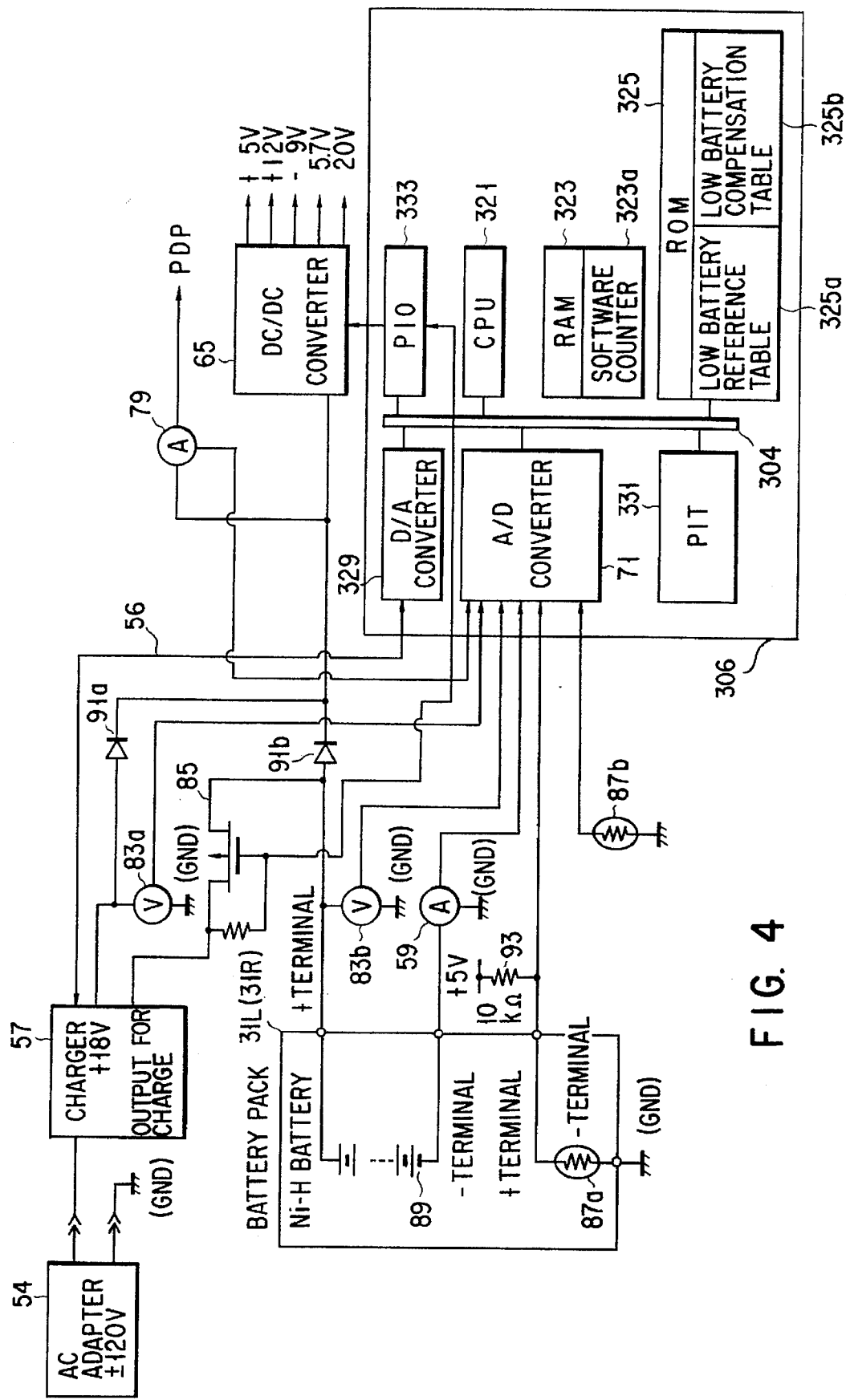
FIG. 4 is a block diagram showing a circuit for detecting a full charge state of a battery in the power source control apparatus shown in FIG. 3.

FIG. 4 is a block diagram of a circuit for detecting a battery full charge state in the PC-CPU. The same reference numerals in FIG. 4 denote the same parts as in FIG. 3. In FIG. 4, the battery pack 31L (31R) is connected to the PC-CPU 306 and the DC-DC converter 65, and supplies a DC power source voltage to the DC-DC converter 65. The PC-CPU 306 is connected to the main CPU 11 through the PS-IF 28 (shown in FIG. 2) and the system bus 10. The PC-CPU 306 detects an overcharge state and a low battery state of the battery pack 31L (31R) on the basis of the power source voltage, the current, and the temperature of the battery pack 31L (31R), and informs the voltage capacity state of the battery pack 31L (31R) to the main CPU 11. The PC-CPU 306 incorporates a 4-bit CPU 321, and constitutes the PC-CPU 306 shown in FIG. 2 together with a RAM 323 and a ROM 325. The DC-DC converter 65 generates a constant DC power source voltage necessary for operating the main body from the DC power source voltage supplied from the battery pack 31L (31R).

Furthermore, an AC charger (AC adapter) 1 is connected to a commercial AC power source of 100 V, and supplies a rated DC voltage to a charger 57. The AC adapter 1 is arranged outside the personal computer main body. The charger 57 supplies a power source voltage of +18 V to the DC-DC converter 65. A voltage detector 83a is connected in parallel with the +18 V output terminal of the charger 57. The voltage detector 83a detects the output voltage from the charger 57 at a predetermined cycle. The voltage value detected by the voltage detector 83a is supplied to the A/D converter 71 of the PC-CPU 306. The charger 57 controls a charge current to the battery pack 31L (31R) on the basis of a charge control signal from the PC-CPU 306. Reference numeral 85 denotes a p-channel field effect transistor (FET), which serves as a protection circuit for forcibly stopping a charge operation to the battery pack 31L (31R). The battery pack 31L (31R) incorporates an Ni-H battery 89 for battery-driving the portable computer, and a first temperature sensor 87a for detecting the temperature in the battery pack 31L (31R). When the AD adapter 54 is not connected to the main body, the DC voltage is supplied from the battery pack 31L (31R) to the DC-DC converter 65. The Ni-H battery 89 incorporates 12 cells in the battery pack 31L (31R). The current detector 59 is connected in series with the "−" terminal of the battery of the battery pack 31L (31R), and a voltage detector 83b is connected in parallel with the "+" terminal of the battery. The voltage detector 83b detects a charge/discharge voltage of the battery pack 31L (31R) at a predetermined cycle. The current detector 59 detects a charge/discharge current of the battery pack 31L (31R) at a predetermined cycle. The voltage value and the current value respectively detected by the voltage detector 83b and the current detector 59 are supplied to the A/D converter 71 of the PC-CPU 306. A transistor 91b for preventing a reverse current is connected in series with the "+" terminal of the battery pack 31L (31R).

The first temperature sensor 87a detects the temperature of the battery 89. The detected temperature is used for determining the full charge state or the low battery state of the battery pack 31L (31R). The temperature value detected by the first temperature sensor 87a is supplied to the A/D converter 71 of the PC-CPU 306. The "−" terminal of the first temperature sensor 87a is connected to a ground (GND) terminal. Reference numeral 87b denotes a second temperature sensor used for accurately determining the resistance value of the first temperature sensor 87a which depends on the ambient temperature. The PC-CPU 306 recognizes the battery temperature using the voltage value output from the first temperature sensor 87a. The resistance value of the first temperature sensor 87a depends on the temperature generated from peripheral units out of the battery pack. For example, when the resistor temperature of the first temperature sensor 87a is 0° C., a voltage value supplied to the A/D converter 71 of the PC-CPU 306 is 3.65 V. When the resistor temperature is 40° C., the voltage value supplied to the A/D converter 71 of the PC-CPU 306 is 0.78 V. When a variation in output voltage value due to a change in ambient temperature is taken into consideration, the voltage drop value of the first temperature sensor 87a is compensated for by the temperature detected by the second temperature sensor 87b. Thus, the PC-CPU 306 can recognize the accurate temperature in the battery pack 31L.

The compensation value is stored in the ROM 325 of the PC-CPU 306. The second temperature sensor 87b gives a compensation value for the temperature detected by the first temperature sensor 87a, and detects whether each unit is within an allowable temperature range. The respective units include a high-density printed circuit board (PCB), the FDD, the HDD, and the like. The PC-CPU 306 reads the temperature value detected by the second temperature sensor 87b, and compares the read temperature value with a use temperature range value of the respective units stored in the ROM 325.

If the temperature of the respective units exceeds the use temperature range value, the PC-CPU 306 informs this to a user by an alarm tone, executes a resume function, and thereafter, automatically stops a power supply to the main body. The A/D converter 71 is connected to the CPU 321 through an internal bus 304.

The internal bus 304 is also connected to a parallel I/O interface (PIO) 333 and a programmable interrupt timer (PIT) 331. A software counter 323a in the RAM 323 measures time second by second each time an interrupt signal is generated from the PIT 331. The default value of the software counter 323a is "0". The ROM 325 stores a table 325a for detecting a low-battery reference voltage, and a table 325b for compensating for the reference voltage. Furthermore, the ROM 325 also stores a table for compensating for the voltage value output from the first temperature sensor 87a based on temperature.

The CPU 321 fetches a digital value obtained by converting an analog value from the current detector 59 by the A/D converter 71, and obtains the low-battery reference voltage corresponding to the detected current value with reference to the conversion table 325a in the ROM 325. The CPU 321 recognizes a connection/non-connection state of the detachable battery pack 31L (31R) in accordance with the following manner. When the battery pack 31L (31R) is not connected to the main body, a voltage value pulled up to +5 V by a pull-up resistor 93 is input to the PC-CPU 306. At this time, the CPU 321 determines that the battery pack 31L (31R) is not connected to the main body. When the battery pack 31L (31R) is connected to the main body, a current flows from the "+" terminal through the first temperature sensor 87a. In this case, a voltage drop (analog value) occurs by the resistance of the first temperature sensor 87a. This analog value is input to the A/D converter 71, and is converted into a digital value.

The CPU 321 looks up the table in the ROM 325 on the basis of the converted digital value, thereby detecting connection of the battery pack 31L (31R) to the main body, and the temperature value in the battery pack 31L (31R). The CPU 321 programs the PIT 331 so that the interrupt signal is generated at a 1-sec interval, and responds to the interrupt signal from the PIT 331.

The CPU 331 allocates the software counter 323a in the RAM 323, and increments the software counter 323a by one second every time the interrupt signal is generated. The CPU 321 controls the charger 57 and the DC—DC converter 65 on the basis of data from the voltage detectors 83a and 83b, the current detector 59, 79 and the temperature sensor 87a, 87b. When the CPU 321 determines that the battery pack 31L (31R) is being charged, it controls the DC—DC converter 65 through the PIO 333 to stop a power supply to the main body.

When a charge current cannot be disabled due to disconnection of a charge control signal line to the charger 57 or the like, the CPU 321 outputs logic level "1" to the FET 85 through a D/A converter 329, thereby forcibly stopping the charge current.

The low battery compensation table 325b stores values calculated in advance in consideration of a difference in charge time and the resolution (1 digit=98 mv) of the A/D converter 71. The CPU 321 reads the battery temperature, and looks up the low battery compensation table 325b of the ROM 325. In this arrangement, when some battery cells of the battery 89 malfunction, the first temperature sensor 87a incorporated in the battery pack 31L (31R) detects heat generated by the malfunctioning cells of the battery 89, and the power source circuit stops the charge operation. As a result, an accident caused by an overcharge state of the battery pack 31L (31R) can be prevented.

Furthermore, in the present invention, as shown in FIG. 4, the second temperature sensor 87b for detecting an external temperature is arranged. The second temperature sensor 87b is used for detecting a difference between the temperature in the battery and the ambient temperature out of battery pack 31L(R), and for discriminating whether the temperature rise in the battery is caused not by a full charge state but by the ambient temperature rise out of battery pack 31L(R).

FIG. 4 exemplifies a case with a single battery. When two batteries are used, a third temperature sensor corresponding to the first temperature sensor 87a built in the battery pack, and is connected to the A/D converter 71.

FIGS. 3 and 4 show basically different arrangements.

The voltage and current detectors in FIG. 3 cannot determine whether a power is supplied from the AC adapter or the battery.

On the contrary, according to the arrangement shown in FIG. 4, a power from the AC adapter can be detected by the voltage detector 83a, and a power from the battery can be detected by the voltage detector 83b. Thus, the PC-CPU 306 can determine whether a power is supplied from the charge circuit or the battery in accordance with the circuit arrangement shown in FIG. 4.

Figure 5:
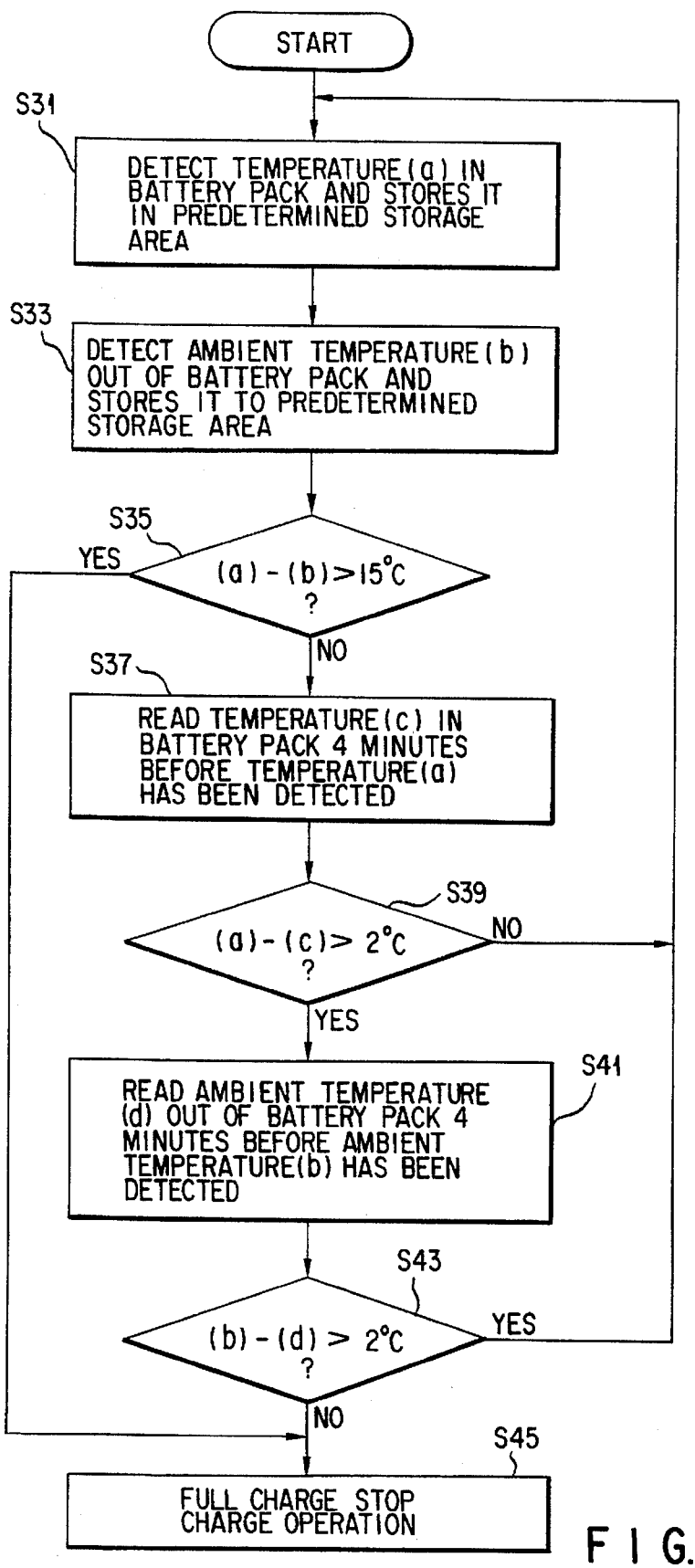
FIG. 5 is a flow chart showing control for detecting the full charge state of the battery.

A full charge detection method of the battery pack 31L (31R) according to a first feature of the present invention will be described below with reference to FIG. 5. The PC-CPU 306 detects the temperature (a) from the first (battery) temperature sensor 87a in the battery pack 31L (31R) in step S31. In step S33, the PC-CPU 306 also detects the ambient temperature value (b) out of the battery pack from the second (external) temperature sensor 87b. In step S35, the PC-CPU 306 checks if the temperature in the battery pack 31L (31R) and the ambient temperature have a temperature difference exceeding 15° C. therebetween. If Y (YES) in step S35, the flow advances to step S45, and it is determined that the battery pack 31L (31R) is fully charged, thus stopping the charge operation.

On the other hand, if the two temperatures do not have a temperature difference exceeding 15° C. therebetween, the flow advances to step S37, and the PC-CPU 306 reads a temperature value (c) in the battery pack four minutes before the temperature (a) has been detected. In step S39, the PC-CPU 306 checks if the temperature in the battery has risen by 2° C. or more. If N (NO) in step S39, the PC-CPU 306 returns the flow to step S31. On the other hand, if Y in step S39, the PC-CPU 306 reads, in step S43, ambient temperature value (d) out of the battery pack four minutes before the ambient temperature (b) has been detected. If it is determined in step S43 that the external temperature has risen by 2° C. or more in four minutes, the PC-CPU 306 determines that the temperature rise in the battery pack by 2° C. or more in step S39 is caused by the external temperature rise, and the flow returns to step S31.

However, if it is determined in step S43 that the external temperature has not risen by 2° C. or more in four minutes, the PC-CPU 306 determines the temperature rise in the battery is caused by the full charge state of the battery. Therefore, the PC-CPU 306 determines the full charge state, and stops the charge operation in step S45.

Note that the above-mentioned values 15° C., 2° C., and four minutes are determined based on experimental values of the present inventors.

Figure 6:
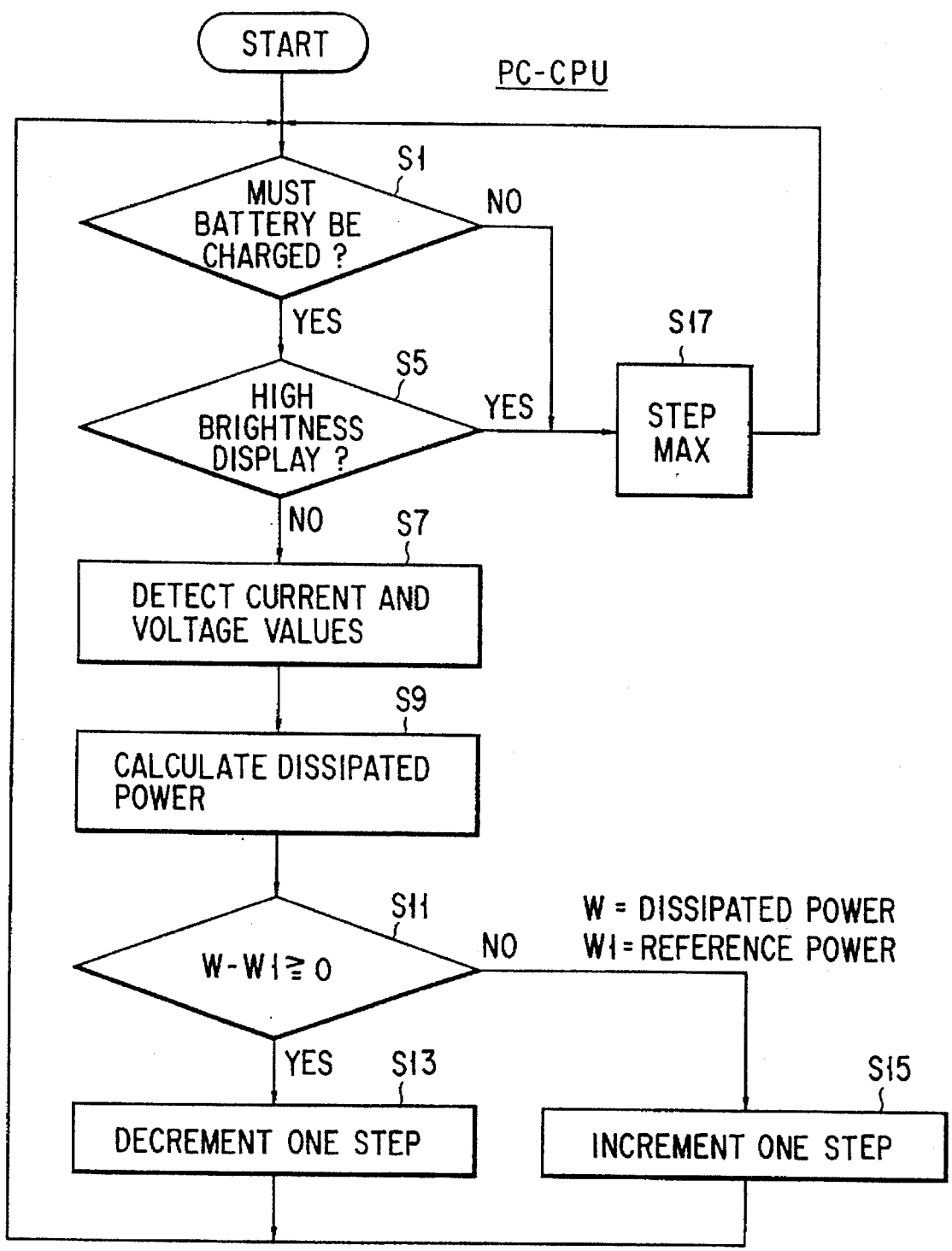
FIG. 6 is a flow chart showing control of a PC-CPU 306 in the power source control apparatus.

The operation of the PC-CPU 306 when the charge mode is set, according to a second feature of the present invention will be described below with reference to FIG. 6.

The PC-CPU 306 checks, in step S1, a residual capacity of the battery pack as well as whether the AC adapter is connected to a computer main body, and determines whether the battery must be charged or not. If the battery must not be charged, the PC-CPU 306 maximizes a step voltage (1 step=5 V/128) in step S17. Therefore, the PC-CPU 306 outputs the maximum step value 10 to the D/A converter 77. As a result, the D/A converter 77 outputs a brightness control signal corresponding to the maximum brightness voltage to the PDP brightness controller 75. Therefore, the PDP 37 displays data in the high brightness display mode.

If the battery must be charged the flow advances to step S5, and the PC-CPU 306 checks whether it receives or not a command indicating charge command (normal brightness display mode). There are two types of charge mode setting commands supplied from the main CPU 11, namely "BFH" (charge mode is disabled) and "BCH" (charge mode is enabled). The charge mode in this embodiment is a mode in which a charge operation is given preference to the high brightness display when a dissipated power becomes a certain level or more. If YES (high brightness mode, namely no charge mode) in step S5, the flow advances to step S17 to perform the above-mentioned control. On the other hand, if NO (normal brightness mode) in step S5, the flow advances to step S7, and the PC-CPU 306 detects the current value and the voltage value from the ammeter 79 and the voltage detector 83a, 83b, respectively. In step S9, the PC-CPU 306 calculates dissipated electric power based on the current and voltage values detected in step S7.

The PC-CPU 306 then checks in step S11 if the dissipated electric power calculated in step S9 is equal to or larger than reference electric power. If YES in step S11, the PC-CPU 306 decrements a step voltage by one step. In other words, the PC-CPU 306 decrements the brightness setting value in the register 306a by one step. On the other hand, if NO in step S11, the PC-CPU 306 increments a step voltage by one step. After the processing in step S13 or S15, the flow returns to step S1, and the PC-CPU 306 repeats the processing in steps S1 through S17.

In this manner, according to the present invention, the dissipated electric power and the reference value are compared with each other, and the dissipated power is incremented or decremented by one step according to the comparison result. This operation is performed for the following reason.

Figure 1:
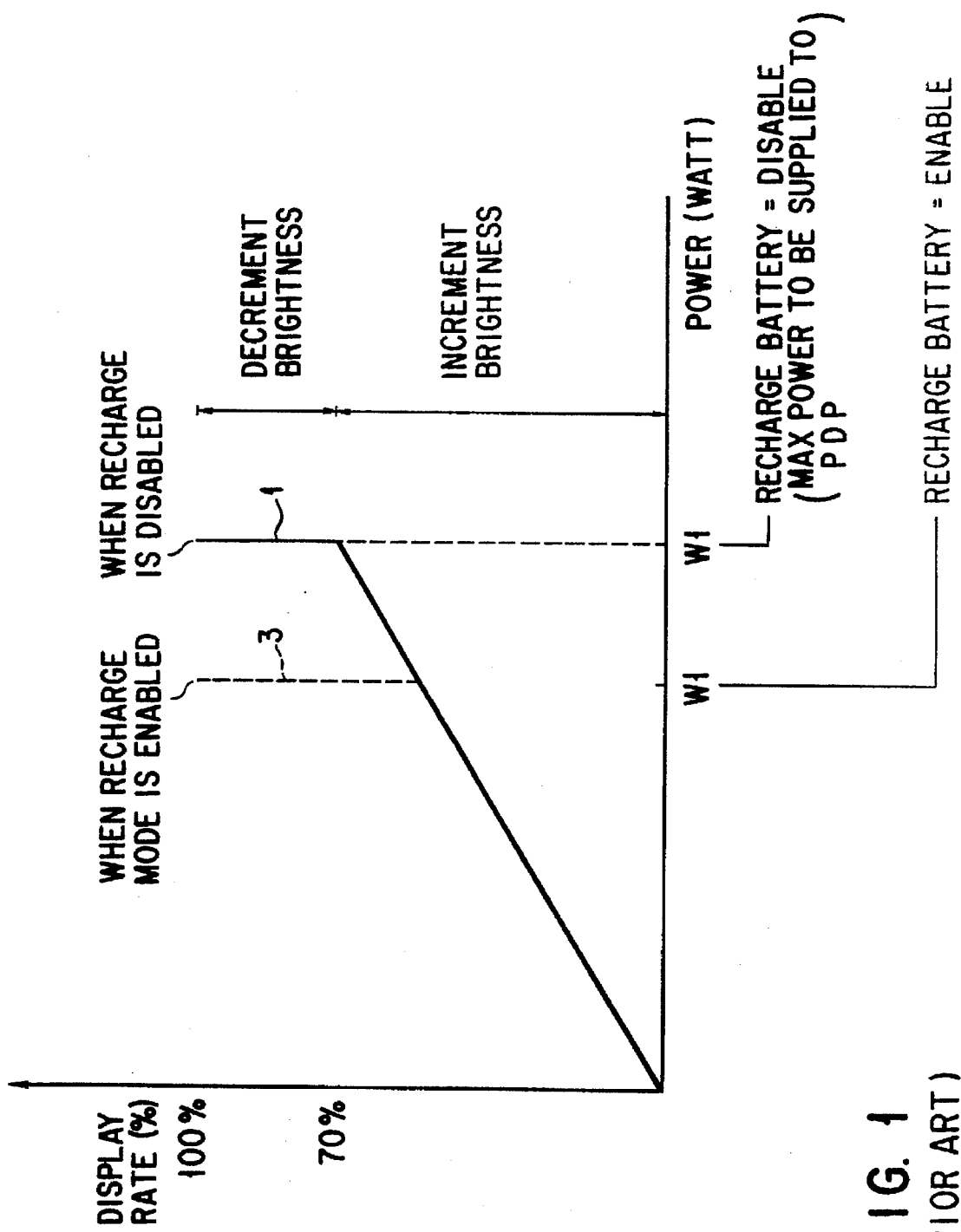
FIG. 1 is a graph showing the relationship between electric power and the display rate in a plasma display unit.

More specifically, in the plasma display unit, the input electric power amount is predetermined. When electric power exceeding the predetermined amount is supplied, an inverter in the plasma display unit is destroyed. On the other hand, as shown in FIG. 1, the dissipated power increases in proportion to an increase in display rate. When the display rate is kept increased, the dissipated electric power exceeds rated electric power at a given timing. According to the present invention, when the dissipated electric power reaches a predetermined electric power value, control is made not to increase the dissipated electric power any more. In order to maintain a constant electric power value while increasing the display rate, the brightness voltage is decreased. More specifically, the display mode is switched from the high brightness display mode to the normal brightness display mode. Furthermore, when the charge mode is set, the value W1 in step S11 is set to be a value (e.g., 6 W) obtained by subtracting electric power necessary for charging the battery from the rated maximum electric power (e.g., 8 W) so as to assure a current for the battery.

A charge mode selecting method according to a third feature of the present invention, namely an embodiment wherein a user can arbitrarily select a mode for, when the charge mode is selected, i.e., when the dissipated electric power exceeds a predetermined value, preferentially performing a charge operation by decreasing the display brightness will be described below. The reason why such an arbitrary selection is allowed is that some users want to display data in the high brightness display mode even though the battery cannot be charged.

Figure 7:
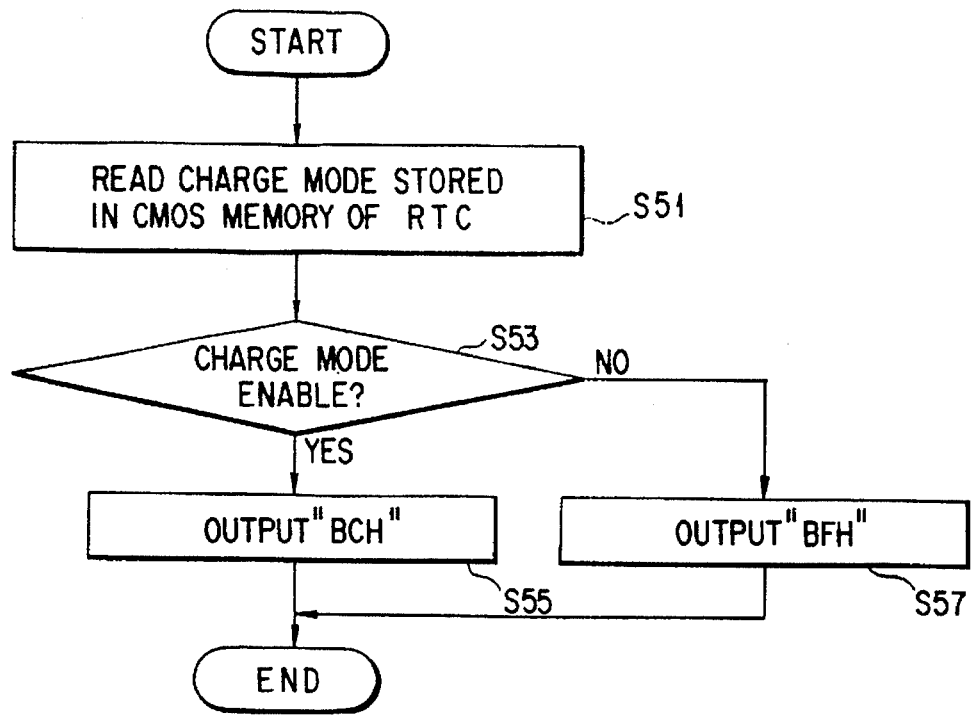
FIG. 7 is a flow chart showing processing in an IRT routine included in a BIOS in a ROM 12 shown in FIG. 2.

When the power switch of the computer system is turned on, the IRT routine in the BIOS stored in the ROM 12 is executed. More specifically, as shown in FIG. 7, the CPU 11 checks in step S51 a predetermined bit in which the charge mode is set and which is stored in the CMOS memory in the RTC 17. If the bit is set, the CPU 11 supplies a charge mode setting command to the PC-CPU 306. In step S53, the CPU 11 determines whether the charge mode is enabled or not. If the charge mode is disabled in step S53, the CPU 11 outputs in step S55, a "BF (hexa)" command; if the charge mode is enabled, the CPU 11 outputs a "BC (hexa)" command in step S57. In response to this command, the PC-CPU performs the above-mentioned charge control. The charge mode is set in a setup processing routine.

Figure 8:
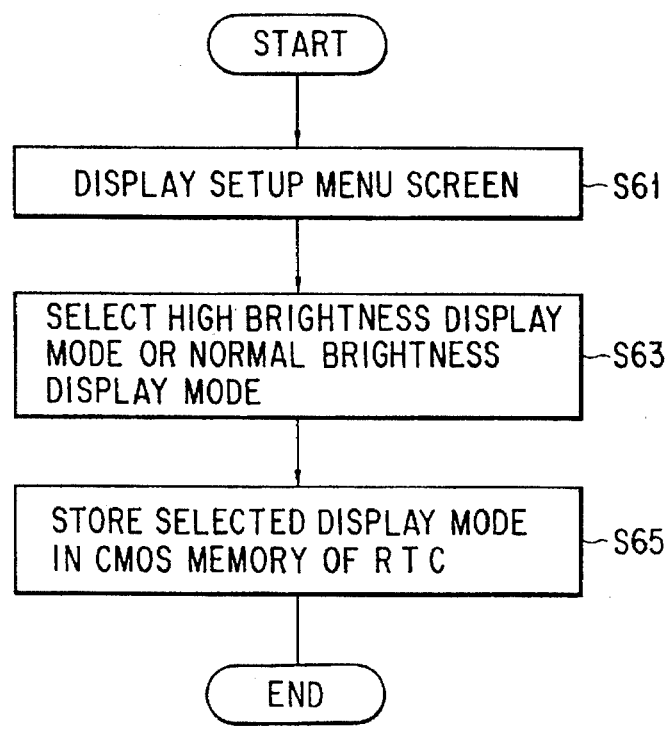
FIG. 8 is a flow chart showing processing of a setup routine included in the BIOS in the ROM 12 shown in FIG. 2.

FIG. 8 is a partial flow chart of the setup processing routine. The CPU 11 causes the PDP 37 to display a setup menu screen shown in FIG. 9 in step S61. In step S63, a user moves the cursor to "Recharge Battery" 101 of various setup items displayed on the setup menu screen using a vertical arrow key. When the charge mode is to be enabled, the user selects "Enable"; otherwise, he or she selects "Disable". The item "Enable" or "Disable" is selected using a horizontal arrow key. The CPU 11 stores the selected charge mode data in the CMOS memory of the RTC 17 in step S65.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A power source control apparatus for a portable computer, provided with an AC adapter for supplying a power, and a rechargeable battery pack connected to the AC adapter, comprising:

a first temperature detecting means including a first temperature sensor provided within the battery pack for detecting a first temperature value within the battery pack by the first temperature sensor;

a second temperature detecting means including a second temperature sensor for detecting an ambient temperature value outside the battery pack by the second temperature sensor; and comparing means for comparing the first temperature value obtained from the first temperature detecting means with the second temperature value obtained from the second temperature detecting means;

first determining means for determining that the battery pack is fully charged when the first temperature value is larger than the second temperature value by a first reference value;

storage means for storing the first temperature value detected by the first temperature detecting means;

means for reading from the storage means a third temperature value detected by the first temperature detecting means before a predetermined period of time when the first determining means determines that the first temperature value is less than the second temperature value;

second determining means for determining that the battery pack is not fully charged when the first temperature value is less than the third temperature value by a second reference value.

2. The apparatus according to claim 1, wherein:

the storage means stores the temperature value detected by the second temperature detecting means;

the reading means reads from the storage means a fourth temperature value detected by the second detecting means before a predetermined period of time when the first temperature value is larger than the third-temperature value by a second reference value; and the apparatus further comprises, third determining means for determining that the battery pack is not fully charged when the second temperature value is larger than the fourth temperature value by a third reference value and for determining that the battery pack is fully charged when the second temperature value is less than the fourth temperature value by the second reference value.

3. The power source control apparatus according to claim 2, further comprising a second storage means for storing the first, second, and third reference values.

4. The apparatus according to claim 2, wherein the reading means includes means for reading from the storage means the temperature value of the battery pack four minutes before the first temperature value is detected.

5. The apparatus according to claim 2, wherein the reading means includes means for reading from the storage means, the temperature value of the battery pack four minutes before the second temperature value is detected.

6. A power source control method for a portable computer, provided with an AC adapter for supplying a power, and a rechargeable battery pack connected to the AC adapter, comprising the steps of;

a) detecting a first temperature value within the battery by a first temperature sensor provided within the battery pack;

b) detecting a second temperature value of an ambient temperature outside the battery pack by a second temperature sensor provided out of the battery pack;

c) comparing the first temperature value obtained in step a) with the second temperature value obtained in step b);

d) determining that the battery pack is fully charged when the first temperature value is larger than the second temperature value by a first reference value;

e) storing in a memory the first temperature value detected in step a);

f) reading from the memory a third temperature value detected in step a) before a predetermined period of time when the determining step d) determines that the first temperature value is less than the second temperature value; and g) determining that the battery pack is not fully charged when the first temperature value is less than the third temperature value by a second reference value.

7. The method according to claim 6, wherein:

the step e) stores the first temperature value detected in step d);

the step f) reads from the memory a fourth temperature value detected in step b) before a predetermined period of time when the first temperature value is larger than the third temperature value by a second reference value; and the method further comprises:

h) determining that the battery pack is not fully charged when the second temperature value is larger than the fourth temperature value by a third reference value and determining that the battery pack is fully charged when the second temperature value is less than the fourth temperature value by the second reference value.

8. The method according to claim 7, further comprising a step of i) storing the first, second, and third reference values.

9. The method according to claim 8, wherein the step f) comprises reading the temperature value of the battery pack four minutes before the first temperature value is detected.

10. The method according to claim 7, wherein the step f) comprises reading the temperature value of the battery pack four minutes before the second temperature value is detected.

11. A power source control apparatus for a portable computer, provided with an AC adapter for supplying a power, and a rechargeable battery pack connected to the AC adapter, comprising:

a first temperature detecting means including a first temperature sensor provided within the battery pack for detecting a first temperature value within the battery by the first temperature sensor;

a second temperature detecting means including a second temperature sensor for detecting an ambient temperature value outside the battery pack by the second temperature sensor; and comparing means for comparing the first temperature value obtained from the first temperature detecting means with the second temperature value obtained from the second temperature detecting means;

first determining means for determining that the battery pack is fully charged when the first temperature value is larger than the second temperature value by a first reference value;

storage means for storing the first temperature value detected by the first temperature detecting means;

means for reading from the storage means a third temperature value detected by the first temperature detecting means before a predetermined period of time when the first determining means determines that the first temperature value is less than the second temperature value; and second determining means for determining that the battery pack is fully charged when the first temperature value is larger than the third temperature value by a second reference value.

12. The apparatus according to claim 11, wherein:

the storage means stores the temperature value detected by the second temperature detecting means;

the reading means reads from the storage means a fourth temperature value detected by the second detecting means before a predetermined period of time when the first temperature value is larger than the third temperature value by a second reference value; and the apparatus further comprises, third determining means for determining that the battery pack is not fully charged when the second temperature value is larger than the fourth temperature value by a third reference value and for determining that the battery pack is fully charged when the second temperature value is less than the fourth temperature value by the second reference value.

13. The apparatus according to claim 11, wherein the reading means includes means for reading from the storage means the temperature value of the battery pack four minutes before the first temperature value is detected.

14. A power source control method for a portable computer, provided with an AC adapter for supplying a power, and a rechargeable battery pack connected to the AC adapter, comprising the steps of:

a) detecting a first temperature value within the battery by a first temperature-sensor provided within the battery pack;

b) detecting a second temperature value of an ambient temperature outside the battery pack by a second temperature sensor provided out of the battery pack;

c) comparing the first temperature value obtained in step a) with the second temperature value obtained in step b);

d) determining that the battery pack is fully charged when the first temperature value is larger than the second temperature value by a first reference value;

e) storing in a memory the first temperature value detected in step a);

f) reading from the memory a third temperature value detected in step a) before a predetermined period of time when the determining step d) determines that the first temperature value is less than the second temperature value; and g) determining that the battery pack is fully charged when the first temperature value is larger than the third temperature value by a second reference value.

15. The method according to claim 14, wherein:

the step e) stores the first temperature value detected in step d);

the step f) reads from the memory a fourth temperature value detected in step b) before a predetermined period of time when the first temperature value is larger than the third temperature value by a second reference value; and, the method further comprises, h) determining that the battery pack is not fully charged when the second temperature value is larger than the fourth temperature value by a third reference value and determining that the battery pack is fully charged when the second temperature value is less than the fourth temperature value by the second reference value.

16. The method according to claim 15, further comprising a step of i) storing the first, second, and third reference values.

17. The method according to claim 16, wherein the step f) comprises reading the temperature value of the battery pack four minutes before the first temperature value is detected.

18. The method according to claim 37, wherein the step f) comprises reading the temperature value of the battery pack four minutes before the second temperature value is detected.

* * * * *